(12) United States Patent
Akkapeddi et al.

(10) Patent No.: US 9,068,113 B2
(45) Date of Patent: *Jun. 30, 2015

(54) LOW PHOSPHOROUS OXYGEN SCAVENGING COMPOSITIONS REQUIRING NO INDUCTION PERIOD

(71) Applicant: Graham Packaging Company, L.P., York, PA (US)

(72) Inventors: Murali K. Akkapeddi, York, PA (US); Brian A. Lynch, Merrimack, NH (US); Timothy Schnetzka, Wrightsville, PA (US)

(73) Assignee: GRAHAM PACKAGING COMPANY, L.P., York, PA (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/799,880

(22) Filed: Mar. 13, 2013

(65) Prior Publication Data

US 2013/0306905 A1    Nov. 21, 2013

Related U.S. Application Data

(60) Provisional application No. 61/647,745, filed on May 16, 2012.

(51) Int. Cl.
C08K 5/098 (2006.01)
C09K 15/30 (2006.01)
(Continued)

(52) U.S. Cl.
CPC .......... C09K 15/30 (2013.01); C08K 5/005 (2013.01); C08K 5/20 (2013.01); C08K 2201/012 (2013.01); C08K 2201/019 (2013.01); C08K 5/098 (2013.01); C08K 5/3417 (2013.01)

(58) Field of Classification Search
CPC ............ C08L 67/02; C08K 5/20; C08K 3/08; C08K 5/098; C08K 5/3417; C08K 5/005; C08K 15/30; C08K 2201/012; C08K 2201/019
USPC .............................. 252/188.28; 524/210, 431
See application file for complete search history.

(56) References Cited

U.S. PATENT DOCUMENTS 4,536,409 A    8/1985  Farrell et al.
5,021,515 A    6/1991  Cochran et al.
(Continued)

FOREIGN PATENT DOCUMENTS

EP      1 911 606       4/2008
WO      2010/042125     4/2010
WO      2012/154379    11/2012

OTHER PUBLICATIONS

International Search Report and Written Opinion mailed by the European Patent Office (as International Searching Authority) on May 24, 2013 for corresponding international patent application No. PCT/US2013/030842.

Primary Examiner — Susannah Chung
Assistant Examiner — Josephine Chang
(74) Attorney, Agent, or Firm — Stradley Ronon Stevens & Young, LLP (57) ABSTRACT

The present invention provides a composition comprising: a polyester base polymer; at least one non-polymeric oxidizable organic compound; at least one transition metal in a positive oxidation state, said metal being present in the composition in an amount of from about 10 to about 400 ppm, wherein the polyester base polymer comprises less than about 40 ppm phosphorous. The compositions of the present invention do not exhibit an induction period prior to the onset of oxygen scavenging upon formation into a container.

12 Claims, 2 Drawing Sheets

(51) Int. Cl.
*C08K 5/00* (2006.01)
*C08K 5/20* (2006.01)
*C08K 5/3417* (2006.01)

(56) References Cited

U.S. PATENT DOCUMENTS

| | | |
|---|---|---|
| 5,049,624 A | 9/1991 | Adams et al. |
| 5,075,362 A | 12/1991 | Hofeldt et al. |
| 5,211,875 A | 5/1993 | Speer et al. |
| 5,639,815 A | 6/1997 | Cochran et al. |
| 6,083,585 A | 7/2000 | Cahill et al. |
| 6,254,803 B1 | 7/2001 | Matthews et al. |
| 6,423,776 B1 | 7/2002 | Akkapeddi et al. |
| 6,558,762 B2 | 5/2003 | Cahill et al. |
| 7,396,865 B2 | 7/2008 | Tsuji et al. |
| 2004/0013833 A1 | 1/2004 | Lee et al. |
| 2004/0043172 A1 | 3/2004 | Schmidt et al. |
| 2004/0044118 A1 | 3/2004 | Waddell et al. |
| 2006/0148957 A1 | 7/2006 | Stewart et al. |
| 2006/0180790 A1 | 8/2006 | Deshpande et al. |
| 2008/0075965 A1 | 3/2008 | Dershem |
| 2008/0161529 A1 | 7/2008 | Jenkins et al. |
| 2008/0277622 A1 | 11/2008 | Deshpande et al. |
| 2009/0278087 A1* | 11/2009 | Deshpande et al. ..... 252/188.28 |
| 2010/0154361 A1* | 6/2010 | Deshpande et al. ............ 53/467 |
| 2011/0123741 A1 | 5/2011 | Deshpande |
| 2011/0275742 A1 | 11/2011 | Akkapeddi et al. |

\* cited by examiner

LOW PHOSPHOROUS OXYGEN SCAVENGING COMPOSITIONS REQUIRING NO INDUCTION PERIOD

CROSS-REFERENCE TO RELATED APPLICATIONS

This application claims the benefit of priority under 35 U.S.C. §119(e) to earlier filed U.S. patent application Ser. No. 61/647,745, filed on May 16, 2012, the disclosure of which is incorporated herein by reference in its entirety.

BACKGROUND OF THE INVENTION

The present invention relates to compositions useful for oxygen scavenging. The invention also relates to substantially transparent compositions that comprise a base polymer that is substantially free of phosphorous, an oxidizable organic component, and a transition metal. The invention also is directed to uses of such compositions in the construction of packaging for oxygen sensitive materials.

All references, including publications, patent applications, and patents, cited herein are hereby incorporated by reference to the same extent as if each reference were individually and specifically indicated to be incorporated by reference and were set forth in its entirety herein.

It is known in the art to include an oxygen scavenger in the packaging structure for the protection of oxygen sensitive materials. Such scavengers are believed to react with oxygen that is trapped in the package or that permeates from outside of the package, thus extending to life of package contents. These packages include films, bottles, containers, and the like. Food, beverages (such as beer and fruit juices), cosmetics, medicines, and the like are particularly sensitive to oxygen exposure and require high barrier properties to oxygen to preserve the freshness of the package contents and avoid changes in flavor, texture and color.

Use of certain polyamides in combination with a transition metal is known to be useful as the oxygen scavenging material. One particularly useful polyamide is MXD6 which contains meta-xylene residues in the polymer chain. See, for example, U.S. Pat. Nos. 5,639,815; 5,049,624; and 5,021,515.

Other oxygen scavengers include potassium sulfite (U.S. Pat. No. 4,536,409), unsaturated hydrocarbons (U.S. Pat. No. 5,211,875), and ascorbic acid derivatives (U.S. Pat. No. 5,075,362).

U.S. Pat. Nos. 6,083,585 and 6,558,762 to Cahill disclose the oxygen scavenging polyester compositions wherein the oxygen scavenging component is polybutadiene and the catalyst for the oxygen scavenging material is transition metal salts.

U.S. Pat. No. 6,423,776 to Akkapeddi discloses the use of oxidizable polydienes or oxidizable polyethers as oxygen scavengers in blends with polyamides.

U.S. Pat. No. 6,254,803 to Ching discloses the use of polymers having at least one cyclohexenyl group or functionality as oxygen scavengers.

In barrier layers of packaging walls that are made from blends of a polymeric oxygen scavenging material such as that described in all of the above prior art, in a base polymer resin such as PET, an undesirable haze can result due to the immiscibility of the polymeric scavenging materials in PET. It is a well known fact that blends of polymers of dissimilar chemical structures invariably results in phase separation due their mutual segmental incompatibility. Phase separation is the root cause for the haze in such blends.

One approach to minimize the haze in polymer blends is the use of compatibilizers or interfacial agents which improve the dispensability of the polymeric scavenger in the base polymer. However this approach, while it may reduce somewhat, does not eliminate the haze and hence the desired high clarity is not achievable. Thus, there is a need in the art for improved materials such as low molecular weight organic compounds which provide high oxygen scavenging capability when blended into PET to form containers while maintaining substantial transparency. In principle, low molecular weight organic compounds are capable of being miscible in base polymers such as PET due to their molecular size allowing them to penetrate into the free volume that exists between the base polymer chain segments.

Besides appearance, another problem experienced with prior art oxygen scavengers is that once they are incorporated into plastic containers, they require an induction period (i.e., time delay) before the onset of oxygen scavenging. For example, molded containers that employ diamides such as, for example, dibenzyl adipamide (DBA) as oxygen scavengers, the induction period can be at least three months at ambient temperature and humidity or at least four weeks at elevated temperature (38° C.) and humidity (85% RH) after the bottles are filled with deoxygenated water. This induction period is not acceptable in real commercial practice where plastic containers are made and filled immediately (or shortly thereafter) with an oxygen-sensitive food or beverage product. The oxygen scavenging must occur immediately after filling to protect the taste and nutrient qualities of the food and/or beverage products contained within.

Thus, there is a need in the art for effective oxygen scavenging compositions that satisfy container clarity requirements and eliminate any induction period for oxygen scavenging such that prolonged aging or conditioning of formed containers is not needed.

BRIEF SUMMARY OF THE INVENTION

The present invention satisfies this need by providing a composition comprising: a) a polyester base polymer; b) at least one non-polymeric oxidizable organic compound selected from the group consisting of: a compound of formula (I) or (II):

wherein, Ar is aryl or heteroaryl;
X is

Y is alkylene, cycloalkylene, or arylene;
$R_1$ and $R_2$ are each independently H or alkyl;
$R_3$ and $R_4$ are each independently H, alky, cycloalkyl, aryl, or aralkyl;
$R_5$ is alkyl, cycloalkyl, or aryl;
Z and Z' are each independently H, alkyl, cycloalkyl, aryl, or aralkyl; and
n and p are each independently 0, 1, 2, 3, 4, or 5;
and a compound of Formula III or IV:

wherein,

Ar is an o-, m-, or p-phenylene moiety, a substituted phenylene moiety, or a naphthalene moiety; $R_{11}$ and $R_{12}$ are independently selected from the group consisting of: hydrogen, alkyl, alkenyl, and aryl; X is O or $-(CH_2)_n-$; n=0, 1, or 2; and p=0, 1, or 2; and c) at least one transition metal in a positive oxidation state, said metal being present in the composition in an amount of from about 10 to about 400 ppm, wherein the polyester base polymer comprises less than about 40 ppm of total phosphorous.

In another embodiment, the present invention provides a wall for a package comprising at least one layer, said layer comprising a composition, said composition comprising: a) a polyester base polymer; b) at least one non-polymeric oxidizable organic compound selected from the group consisting of: a compound of formula (I) or (II):

-continued wherein, Ar is aryl or heteroaryl;
X is

Y is alkylene, cycloalkylene, or arylene;
$R_1$ and $R_2$ are each independently H or alkyl;
$R_3$ and $R_4$ are each independently H, alky, cycloalkyl, aryl, or aralkyl;
$R_5$ is alkyl, cycloalkyl, or aryl;
Z and Z' are each independently H, alkyl, cycloalkyl, aryl, or aralkyl; and
n and p are each independently 0, 1, 2, 3, 4, or 5;
and a compound of Formula III or IV:

wherein,

Ar is an o-, m-, or p-phenylene moiety, a substituted phenylene moiety, or a naphthalene moiety; $R_{11}$ and $R_{12}$ are independently selected from the group consisting of: hydrogen, alkyl, alkenyl, and aryl; X is O or —$(CH_2)_n$—; n=0, 1, or 2; and p=0, 1, or 2; and c) at least one transition metal in a positive oxidation state, said metal being present in the composition in an amount of from about 10 to about 400 ppm, wherein the polyester base polymer comprises less than about 40 ppm of total phosphorous.

DETAILED DESCRIPTION OF THE INVENTION

The present invention concerns compositions that are useful in the manufacture of packaging for oxygen sensitive materials. In some embodiments, the compositions of the present invention comprise a polyester base polymer, a non-polymeric oxidizable organic component, and a transition metal in a positive oxidation state, wherein the polyester base polymer comprises less than about 40 ppm of total phosphorous, and wherein the composition exhibits excellent oxygen scavenging properties as well as excellent clarity (i.e., lack of haze) when blow molded, for example, from a preform into a monolayer container via an injection stretch blow molding process. If the polyester base polymer includes more that 40 ppm of a phosphorous-containing compound, the composition would require an induction period prior to any significant oxygen scavenging.

Compositions of the instant invention comprise at least one base polymer. As used herein, the term "base polymer" refers to a polymer component of a container of the present invention that provides the structure and mechanical properties of the container. The term "base polymer" is synonymous with the term "structural polymer," which is commonly used in the art.

In preferred embodiments, the base polymer is a polyester. In certain embodiments, the polyester polymers of the invention are thermoplastic and, thus, the form of the compositions are not limited and can include a composition in the melt phase polymerization, as an amorphous pellet, as a solid stated polymer, as a semi-crystalline particle, as a composition of matter in a melt processing zone, as a bottle preform, or in the form of a stretch blow molded bottle or other articles. In certain preferred embodiments, the polyester is polyethylene terephthalate (PET).

Examples of suitable polyester polymers include polyethylene terephthalate homopolymers and copolymers modified with one or more polycarboxylic acid modifiers in a cumulative amount of less than about 15 mole %, or about 10 mole % or less, or about 8 mole % or less, or one or more hydroxyl compound modifiers in an amount of less than about 60 mol %, or less than about 50 mole %, or less than about 40 mole %, or less than about 15 mole %, or about 10 mole % or less, or about 8 mole % or less (collectively referred to for brevity as "PET") and polyethylene naphthalate homopolymers and copolymers modified with a cumulative amount of with less than about 15 mole %, or about 10 mole % or less, or about 8 mole % or less, of one or more polycarboxylic acid modifiers or modified less than about 60 mol %, or less than about 50 mole %, or less than about 40 mole %, or less than about 15 mole %, or about 10 mole % or less, or about 8 mole % or less of one or more hydroxyl compound modifiers (collectively referred to herein as "PEN"), and blends of PET and PEN. A modifier polycarboxylic acid compound or hydroxyl compound is a compound other than the compound contained in an amount of at least about 85 mole %. The preferred polyester polymer is polyalkylene terephthalate, and most preferred is PET.

In some embodiments, the polyester polymer contains at least about 90 mole % ethylene terephthalate repeat units, and in other embodiments, at least about 92 mole %, and in yet other embodiments, or at least about 94 mole %, based on the moles of all repeat units in the polyester polymers.

In addition to a diacid component of terephthalic acid, derivates of terephthalic acid, naphthalene-2,6-dicarboxylic acid, derivatives of naphthalene-2,6-dicarboxylic acid, or mixtures thereof, the polycarboxylic acid component(s) of the present polyester may include one or more additional modifier polycarboxylic acids. Such additional modifier polycarboxylic acids include aromatic dicarboxylic acids preferably having about 8 to about 14 carbon atoms, aliphatic dicarboxylic acids preferably having about 4 to about 12 carbon atoms, or cycloaliphatic dicarboxylic acids preferably having about 8 to about 12 carbon atoms.

Examples of modifier dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "polycarboxylic acid." It is also possible for trifunctional and higher order polycarboxylic acids to modify the polyester.

The hydroxyl component is made from compounds containing 2 or more hydroxyl groups capable of reacting with a carboxylic acid group. In some preferred embodiments, preferred hydroxyl compounds contain 2 or 3 hydroxyl groups. Certain preferred embodiments, have 2 hydroxyl groups. These hydroxyl compounds include $C_2$-$C_4$ alkane diols, such as ethylene glycol, propane diol, and butane diol, among which ethylene glycol is most preferred for container applications. In addition to these diols, other modifier hydroxyl compound component(s) may include diols such as cycloaliphatic diols preferably having 6 to 20 carbon atoms and/or aliphatic diols preferably having about 3 to about 20 carbon atoms. Examples of such diols include diethylene glycol; triethylene glycol; 1,4-cyclohexanedimethanol; propane-1,3-diol and butane-1,4-dial (which are considered modifier diols if ethylene glycol residues are present in the polymer in an amount of at least 85 mole % based on the moles of all hydroxyl compound residues); pentane-1,5-diol; hexane-1,6-diol; 3-methylpentanediol-(2,4); neopentyl glycol; 2-methylpentanediol-(1,4); 2,2,4-trimethylpentane-diol-(1,3); 2,5-ethylhexanediol-(1,3); 2,2-diethyl propane-diol-(1, 3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Typically, polyesters such as polyethylene terephthalate are made by reacting a glycol with a dicarboxylic acid as the free acid or its dimethyl ester to produce an ester monomer and/or oligomers, which are then polycondensed to produce the polyester.

In some preferred embodiments, modifiers include isophthalic acid, naphthalenic dicarboxylic acid, trimellitic anhydride, pyromellitic dianhydride, 1,4-cyclohexane dimethanol, and diethylene glycol. The amount of the polyester polymer in the formulated polyester polymer composition ranges from greater than about 50.0 wt. %, or from about 80.0 wt. %, or from about 90.0 wt. %, or from about 95.0 wt. %, or from about 96.0 wt. %, or from about 97 wt. %, and up to about 99.90 wt. %, based on the combined weight of all polyester polymers and all polyamide polymers. The formulated polyester polymer compositions may also include blends of formulated polyester polymer compositions with other thermoplastic polymers such as polycarbonate. In some preferred compositions, the polyester comprises a majority of the composition of the inventions, and in some embodiments the polyester is present in an amount of at least about 80 wt. %, or at least about 90 wt. %, based on the weight of the composition (excluding fillers, inorganic compounds or particles, fibers, impact modifiers, or other polymers serve as impact modifiers or which form a discontinuous phase such as may be found in cold storage food trays).

The polyester base polymer comprises less than about 40 ppm, preferably less than about 30 ppm, more preferably less than about 20 ppm, still more preferably less than about 10 ppm, and most preferably the polyester base polymer is substantially free of phosphorous. A used herein, the term "substantially free of phosphorous" means from 0 to about 1 ppm of total phosphorous. Typical bottle grade PET resins comprise greater than about 40 ppm of phosphorous in the form of phosphoric or phosphonic acid, which are typically used as a stabilizer additive during the resin-forming process. Without intending to be bound any particular theory, it is believed that the phosphorous interferes with the cobalt (or other transition metal) and significantly hinders the efficiency of the cobalt (or other transition metal) to act as an oxidation catalyst and the result is an induction period of from one to three months before oxygen scavenging can be detected in a blow molded bottle. The present inventors have discovere that polyester based containers comprising a polyester base polymer comprising less than about 40 ppm of phosphorous blended with a non-polymeric oxidizable organic component such as, for example, those described below, surprisingly exhibit excellent oxygen scavenging properties without an induction period as was expected in the art. Suitable "low phosphorous" PET resins are commercially available and include, for example, DAK Laser+L44A and L44B, which are available from DAK Americas LLC, Chadds Ford, Pa. 19317, USA. One of ordinary skill in the art would indeed know how to manufacture polyester resins that are substantially free of phosphorous. As used herein, the term "substantially free of phosphorous" means less than about 40 ppm phosphorous.

In preferred embodiments, the polyester base resin is also substantially free of titanium. It has also been discovered that titanium may also interfere with the oxidation catalyst.

Other base polymers may be used with the instant invention provided that the other base polymer is also sustantially free of phosphorous. One example is polypropylene.

Compositions of the present invention also comprise a non-polymeric oxidizable organic component. It is preferred that the non-polymeric oxidizable organic component of the present invention has a high degree of affinity for polyesters, the preferred base polymer. Preferably, the non-polymeric oxidizable organic compound is a polar organic compound such as an amide, an imide, an ester or an ether having oxidizable groups such as benzylic or allylic groups.

In certain embodiments of the present invention, the non-polymeric oxidizable organic component is a compound of formula (I) or (II):

wherein,

Ar is aryl or heteroaryl;

X is $$-\underset{H}{N}-\underset{\parallel}{\overset{O}{C}}-, \quad -\underset{R_5}{N}-\underset{\parallel}{\overset{O}{C}}-, \quad -O-\underset{\parallel}{\overset{O}{C}}-, \quad \text{or}$$

$$-O-;$$

Y is alkylene, cycloalkylene, or arylene;

$R_1$ and $R_2$ are each independently H or alkyl;

$R_3$ and $R_4$ are each independently H, alky, cycloalkyl, aryl, or aralkyl;

$R_5$ is alkyl, cycloalkyl, or aryl;

Z and Z' are each independently H, alkyl, cycloalkyl, aryl, or aralkyl; and n and p are each independently 0, 1, 2, 3, 4, or 5.

As used herein, the term "alkyl" refers to a substituted or unsubstituted aliphatic hydrocarbon chain. Alkyl groups have straight and branched chains. In some embodiments, alkyls have from 1 to 12 carbon atoms or 1 to 6 carbon atoms, unless explicitly specified otherwise. Alkyl groups include, bur are not limited to methyl, ethyl, propyl, isopropyl, butyl, 1-butyl and t-butyl. Specifically included within the definition of "alkyl" are those aliphatic hydrocarbon chains that are optionally substituted.

As used herein, the term "aryl" is defined herein as an aromatic carbocyclic moiety of up to 20 carbon atoms. In some embodiments, aryl groups have 6-20 carbon atoms or 6-14 carbon atoms. Aryls may be a single ring (monocyclic) or multiple rings (bicyclic, up to three rings) fused together or linked covalently. Any suitable ring position of the aryl moiety may be covalently linked to the defined chemical structure. Aryl groups include, but are not limited to, phenyl, 1-naphthyl, 2-naphthyl, dihydronaphthyl, tetrahydronaphthyl, biphenyl, anthryl, phenanthryl, fluorenyl, indanyl, biphenylenyl, acenaphthenyl, and acenaphthylenyl. In some embodiments, phenyl is a preferred aryl. Aryl groups may also be optionally substituted with one or more substituents.

As used herein, the term "heteroaryl" refers to an aromatic heterocyclic ring system, which may be a single ring (monocyclic) or multiple rings (bicyclic, up to three rings) fused together or linked covalently and having for example 5 to 20 ring members. The rings may contain from one to four hetero atoms selected from nitrogen (N), oxygen (O), or sulfur (S), wherein the nitrogen or sulfur atom(s) are optionally oxidized, or the nitrogen atom(s) are optionally substituted (e.g., by alkyl such as methyl) or quarternized. Any suitable ring position of the heteroaryl moiety may be covalently linked to the defined chemical structure. Exemplary heteroaryl groups include, but are not limited to, pyrryl, furyl, pyridyl, pyridine-N-oxide, 1,2,4-thiadiazolyl, pyrimidyl, thienyl, isothiazolyl, imidazolyl, tetrazolyl, pyrazinyl, pyrimidyl, quinolyl, iso quinolyl, thiophenyl, benzothienyl, isobenzofuryl, pyrazolyl, indolyl, purinyl, carbazolyl, benzimidazolyl, and isoxazolyl.

Optional substituents for alkyl, alkenyl, aryl, or heteroaryl groups are well known to those skilled in the art. These substituents include alkyl, alkoxy, aryloxy, hydroxy, acetyl, cyano, nitro, glyceryl, and carbohydrate, or two substituents taken together may be linked as an -alkylene-group to form a ring.

In some embodiments of the present invention, the compositions comprise at least one non-polymeric oxidizable organic compound of the formula (I)-(A) or (II)-(A), which are preferred species of formulas (I) and (II), respectively:

Dibenzyl Adipamide (DBA)

(I)-(A)

N,N'-[1,3-phenylenebis(methylene)]bis Acetamide (II)-(A)

At least one of these non-polymeric oxidizable organic compounds described herein normally will be used in an amount of about 0.1 to about 10 weight percent in an article based on the weight of the composition. In some preferred embodiments, the non-polymeric oxidizable organic compound(s) will be present in an amount of about 1 to about 5 weight percent based on the weight of the composition. In other embodiments, the non-polymeric oxidizable organic compound(s) will be present in an amount of about 1 to about 3 weight percent based on the weight of the composition.

In master batch solutions the amount of non-polymeric oxidizable organic compound will typically be from about 10 to about 90 weight percent based on the weight of the composition. In some preferred embodiments, the amount of non-polymeric oxidizable organic compound will be from about 20 to about 80 weight percent based on the weight of the composition.

The compounds described herein, including non-polymeric oxidizable organic compounds (I)-(A) and (II)-(A), can be made by standard synthetic methods known to those skilled in the art. For example, one could derive non-polymeric oxidizable organic compound (I)-(A) by reacting adipic acid and benzyl amine. Non-polymeric oxidizable organic compound (II)-(A) could be made by reacting m-xylene diamine with a formic acid derivative.

In certain embodiments of the present invention, the non-polymeric oxidizable organic component is a compound of Formula III or IV:

wherein Ar is an o-, m-, or p-phenylene moiety, a substituted phenylene moiety, or a naphthalene moiety; $R_{11}$ and $R_{12}$ are independently selected from the group consisting of: hydrogen, alkyl, alkenyl, and aryl; X is O or $-(CH_2)_n-$; n=0, 1, or 2; and p=0, 1, or 2.

In one aspect, the oxidizable organic component of the present invention is the compound m-xylylene-bis-(tetrahydrophthalimide) ("MXBT"):

MXBT is an exemplary species of formula III wherein Ar is an m-phenylene moiety, $R_{11}$ is H, $R_{12}$ is H, and X is $-(CH_2)_n-$, where n is 0 and p is 0.

In yet another aspect, the oxidizable organic component of the present invention is the compound m-xylylene-bis-(methyltetrahydrophthalimide) ("MXBMT"):

MXBMT is an exemplary species of formula III wherein Ar is an m-phenylene moiety, $R_{11}$ is methyl, $R_{12}$ is H, and X is —$(CH_2)_n$—, where n is 0 and p is 0.

In another aspect the oxidizable organic component of the present invention is the compound m-xylylene-bis-(octenyl succinimide) ("MXBO"):

MXBO is an exemplary species of formula IV wherein Ar is an m-phenylene moiety, $R_{11}$ is an alkenyl group, $R_{12}$ is H, and p is 0.

In another aspect, the oxidizable organic component of the present invention is the compound m-xylylene-bis-citraconimide ("MXBC"):

MXBC is an exemplary species of formula IV wherein Ar is an m-phenylene moiety, $R_{11}$ is an alkyl group, $R_{12}$ is H, and p is 0.

In yet another aspect, the oxidizable organic component of the present invention is the compound m-xylylene-bis(methylnadimide) ("MXBMN"):

MXBMN is an exemplary species of formula III wherein Ar is an m-phenylene moiety, $R_{11}$ is methyl, $R_{12}$ is H, and X is —$(CH_2)_n$—, where n is 1 and p is 0.

In yet another aspect, the oxidizable organic component of the present invention is the compound m-xylylene-bis (nadimide) ("MXBN"):

MXBN is an exemplary species of formula III wherein Ar is an m-phenylene moiety, $R_{11}$ and $R_{12}$ is H, and X is —$(CH_2)_n$—, where n is 1 and p is 0.

Syntheses of oxidizable organic components according to formulas III and IV are described fully in U.S. Patent Application Publication No. 2011/0275742, the disclosure of which is incorporated herein by reference in its entirety.

Thus, in summary, the non-polymeric oxidizable organic component is at least one selected from the group consisting of: formula (I), formula (II), formula (III), and formula (IV).

The transition metal used in the instant compositions is a metal in the positive oxidation state. It should be noted that it is contemplated that one or more such metals may be used. The transition metal functions to catalyze or promote the oxidation of the organic oxidizable component (i.e., the reaction of the organic oxidizable component with molecular oxygen).

The transition metal can be selected from the first, second, or third transition series of the Periodic Table. The metal can be Rh, Ru, or one of the elements in the series of Sc to Zn (i.e., Sc, V, Cr, Mn, Fe, Co, Ni, Cu, and Zn). In some embodiments, cobalt is added in +2 or +3 oxidation state. In some embodiments, it is preferred to use cobalt in the +2 oxidation state. In certain embodiments, copper in the +2 oxidation state is utilized. In some embodiments, rhodium in the +2 oxidation state is used. In certain embodiments, zinc may also be added to the composition. Preferred zinc compounds include those in a positive oxidation state.

Suitable counter-ions to the transition metal cations include carboxylates, such as neodecanoates, octanoates, acetates, lactates, naphthalates, malates, stearates, acetylacetonates, linoleates, oleates, palmitates, 2-ethylhexanoates, or ethylene glycolates; or as their oxides, borates, carbonates, chlorides, dioxides, hydroxides, nitrates, phosphates, sulfates, or silicates among others.

In some embodiments, levels of at least about 10 ppm, or at least about 50 ppm, or at least about 100 ppm of metal can achieve suitable oxygen scavenging levels. The exact amount of transition metal used in an application can be determined by trials that are well within the skill level of one skilled in the art. In some embodiments involving wall applications (as opposed to master batch applications where more catalyst is used), it is preferred to keep the level of metal below about 300 ppm and, in other embodiments, preferably below about 250 ppm. In master batch compositions, the level of transition metal may range from about 1000 to about 10,000 ppm. In some preferred embodiments, the range is from about 2000 to about 5000 ppm.

The transition metal or metals may be added neat or in a carrier (such as a liquid or wax) to an extruder or other device for making the article, or the metal may be present in a concentrate or carrier with the oxidizable organic component, in a concentrate or carrier with a base polymer, or in a concentrate or carrier with a base polymer/oxidizable organic component blend. Alternatively, at least a portion of the transition metal may be added as a polymerization catalyst to the melt phase reaction for making the base polymer (a polyester polymer in some embodiments) and be present as residual metals when the polymer is fed to the melting zone (e.g. the extrusion or injection molding zone) for making the article such as a preform or sheet. It is desirable that the addition of the transition metal does not substantially increase the intrinsic viscosity (IV) of the melt in the melt processing zone. Thus, transition metal or metals may be added in two or more stages, such as once during the melt phase for the production of the polyester polymer and again once more to the melting zone for making the article.

The amounts of the components used in the oxygen scavenging formulations of the present invention can affect the use and effectiveness of this composition. Thus, the amounts of polyester base polymer, oxidizable organic compound, and transition metal catalyst can vary depending on the desired article and its end use. For example, the primary function of the organic oxidizable components detailed above is to react irreversibly with oxygen during the scavenging process, while a primary function of the transition metal catalyst is to facilitate this process. Thus, to a large extent, the amount of the organic oxidizable component present affects the oxygen scavenging capacity of the composition, i.e., the amount of oxygen that the composition can consume, while the amount of transition metal catalyst affects the rate at which oxygen is consumed as well as the induction period.

The oxygen scavenger composition of the present invention can be incorporated in packaging articles having various forms. Suitable articles include, but are not limited to, flexible sheet films, flexible bags, pouches, semi-rigid and rigid containers such as bottles (e.g., PET bottles) or metal cans, or combinations thereof.

Typical flexible films and bags include those used to package various food items and may be made up of one or a multiplicity of layers to form the overall film or bag-like packaging material. The oxygen scavenger composition of the present invention can be used in one, some or all of the layers of such packaging material.

Typical rigid or semi-rigid articles include plastic, paper or cardboard containers, such as those utilized for juices, soft drinks, as well as thermoformed trays or cup normally having thickness in the range of from 100 to 1000 micrometers. The walls of such articles can comprise single or multiple layers of materials. The articles can also take the form of a bottle or metal can, or a crown, cap, crown or cap liner, plastisol or gasket. The oxygen scavenger composition of the present invention can be used as an integral layer or portion of, or as an external or internal coating or liner of, the formed semi-rigid or rigid packaging article. As a liner, the oxygen scavenger composition can be extruded as a film along with the rigid article itself, in, e.g., a coextrusion, extrusion coating, or extrusion lamination process, so as to form the liner in situ during article production; or alternatively can be adhered by heat and/or pressure, by adhesive, or by any other suitable method to an outer surface of the article after the article has been produced.

In one preferred embodiment of the present invention, the composition of the present invention, i.e., a polyester base polymer having less than about 40 ppm of phosphorous, a transition metal in a positive oxygen state, and at least one non-polymeric oxidizable organic component as described above can be employed to form a monolayer bottle. In another preferred embodiment of the present invention, the composition of the present invention can form one layer of a multi-layer bottle wherein the layer comprising the composition of the present invention comprises from at least 1% and typically 2 to 6% of a compound having the structure of formula I or II.

Besides articles applicable for packaging food and beverage, articles for packaging other oxygen-sensitive products can also benefit from the present invention. Such products would include pharmaceuticals, oxygen sensitive medical products, corrodible metals or products, electronic devices and the like.

The composition may also include other components such as pigments, fillers, crystallization aids, impact modifiers, surface lubricants, denesting agents, stabilizers, ultraviolet light absorbing agents, metal deactivators, nucleating agents such as polyethylene and polypropylene, phosphite stabilizers and dyestuffs. Other additional components are well known to those skilled in the art and can be added to the existing composition so long as they do not negatively impact the performance of the compositions. Typically, the total quantity of such components will be less than about 10% by weight relative to the whole composition. In some embodiments, the amount of these optional components is less than about 5%, by weight relative to the total composition.

A common additive used in the manufacture of polyester polymer compositions used to make stretch blow molded bottles is a reheat additive because the preforms made from the composition must be reheated prior to entering the mold for stretch blowing into a bottle. Any of the conventional reheat additives can be used, such additives include various forms of black particles, e.g. carbon black, activated carbon, black iron oxide, glassy carbon, and silicon carbide; the gray particles such as antimony, and other reheat additives such as silicas, red iron oxide, and so forth.

In many applications, not only are the packaging contents sensitive to the ingress of oxygen, but the contents may also be affected by UV light. Fruit juices and pharmaceuticals are two examples of such contents. Accordingly, in some embodiments, it is desirable to incorporate into the polyester composition any one of the known UV absorbing compounds in amounts effective to protect the packaged contents.

The instant compositions can be made by mixing a low-phosphorous polyester base polymer (PET, for example) with the oxidizable organic component and the transition metal composition. Such compositions can be made by any method known to those skilled in the art. In certain embodiments, some or part of the transition metal may exist in the base polymer prior to mixing. This residual metal, for example, can exist from the manufacturing process of the base polymer. In some embodiments, the low-phosphorous polyester base polymer, the oxidizable organic component and the transition metal are mixed by tumbling in a hopper. Other optional ingredients can be added during this mixing process or added to the mixture after the aforementioned mixing or to an individual component prior to the aforementioned mixing step.

The instant composition can also be made by adding each ingredient separately and mixing the ingredients prior melt processing the composition to form an article. In some embodiments, the mixing can be just prior to the melt process zone. In other embodiments, one or more ingredients can be premixed in a separate step prior to bringing all of the ingredients together.

In some embodiments, the invention concerns use of the compositions described herein as a component of a wall that is used in a package for oxygen sensitive materials. The necessary scavenging capacity of a package will generally have to be greater for walls that have a greater permeance in the absence of scavenging additives. Accordingly, a good effect is harder to achieve with inherently higher permeance materials are used.

The wall may be a rigid one, a flexible sheet, or a clinging film. It may be homogenous or a laminate or coated with other polymers. If it is laminated or coated, then the scavenging property may reside in a layer of the wall the permeance of which is relatively high in the absence of scavenging and which alone would not perform very satisfactorily but which performs satisfactorily in combination with one or more other layers which have a relatively low permeance but negligible or insufficient oxygen-scavenging properties. A single such layer could be used on the outside of the package since this is the side from which oxygen primarily comes when the package is filled and sealed. However, such a layer to either side of the scavenging layer would reduce consumption of scavenging capacity prior to filling and sealing.

When the instant compositions are used in a wall or as a layer of a wall, the permeability of the composition for oxygen is advantageously not more than about 3.0, or about 1.7, or about 0.7, or about 0.2, or about 0.03 cm$^3$ mm/(m$^2$ atm day). The permeability of the composition provided by the present invention is advantageously not more than about three-quarters of that in the absence of oxygen-scavenging properties. In some embodiments, the permeability is not more than about one half, one-tenth in certain embodiments, one twenty-fifth in other embodiments, and not more than one-hundredth in yet other embodiments of that in the absence of oxygen-scavenging properties. The permeability in the absence of oxygen-scavenging properties is advantageously not more than about 17 cm$^3$ mm/(m$^2$ atm day), or about 10, and or about 6. A particularly good effect can be achieved for such permeabilities in the range from about 0.5, or about 1.0, to 10, or about 6.0, cm$^3$ mm/(m$^2$ atm day). Measuring oxygen permeation can be performed by one of ordinary skilled in the art employing oxygen permeation (OTR) instrumentation such as, for example, OX-TRAN® instruments available from MOCON, Inc. (Minneapolis, Minn.).

The above-described permeabilities are achieved without an induction period, which, in practical terms means that such permeabilities are achievable immediately after the container is formed.

In another aspect, the instant composition can be used as a master batch for blending with a polymer or a polymer containing component. In such compositions, the concentration of the oxidizable organic component and the transition metal will be higher to allow for the final blended product to have suitable amounts of these components. The master batch may also contain an amount of the polymer to which the master batch is to be blended with. In other embodiments, the master batch may contain a polymer that is compatible with the polymer to which the master batch is to be blended.

In yet another aspect, the compositions of the instant invention can be used for forming a layer of a wall which primarily provides oxygen-scavenging (another layer including polymer providing gas barrier without significant scavenging), or as a head-space scavenger (completely enclosed, together with the package contents, by a package wall). Such techniques are well know to those skilled in the art.

The time period for which the permeability is maintained can be extended by storing the articles in sealed containers or under an inert atmosphere such as nitrogen prior to use with oxygen sensitive materials.

In another aspect, the invention provides a package, whether rigid, semi-rigid, collapsible, lidded, or flexible or a combination of these, comprising a wall as formed from the compositions described herein. Such packages can be formed by methods well known to those skilled in the art.

Among the techniques that may be used to make articles are moulding generally, injection moulding, stretch blow moulding, extrusion, thermoforming, extrusion blow moulding, and (specifically for multilayer structures) co-extrusion and lamination using adhesive tie layers. Orientation, e.g., by stretch blow moulding, of the polymer is especially attractive with phthalate polyesters because of the known mechanical advantages that result.

The melt processing zone for making the article can be operated under customary conditions effective for making the intended articles, such as preforms, bottles, trays, and other articles mentioned below. In one embodiment, such conditions are effective to process the melt without substantially increasing the IV of the melt and which are ineffective to promote transesterification reactions. In some preferred embodiments, suitable operating conditions effective to establish a physical blend of the low-phosphorous polyester polymer, oxidizable organic component, and transition metal are temperatures in the melt processing zone within a range of about 250° C. to about 300° C. at a total cycle time of less than about 6 minutes, and typically without the application of vacuum and under a positive pressure ranging from about 0 psig to about 900 psig. In some embodiments, the residence time of the melt on the screw can range from about 1 to about 4 minutes.

Specific articles include preforms, containers and films for packaging of food, beverages, cosmetics, pharmaceuticals, and personal care products where a high oxygen barrier is needed. Examples of beverage containers are bottles for holding water and carbonated soft drinks, and the invention is particularly useful in bottle applications containing juices, sport drinks, beer or any other beverage where oxygen detrimentally affects the flavor, fragrance, performance (prevent vitamin degradation), or color of the drink. The compositions of the instant invention are also particularly useful as a sheet for thermoforming into rigid packages and films for flexible structures. Rigid packages include food trays and lids. Examples of food tray applications include dual ovenable food trays, or cold storage food trays, both in the base container and in the lidding (whether a thermoformed lid or a film), where the freshness of the food contents can decay with the ingress of oxygen. The compositions of the instant invention also find use in the manufacture of cosmetic containers and containers for pharmaceuticals or medical devices.

The package walls of the instant invention can be a single layer or a multilayer constructions. In some embodiments using multilayer walls, the outer and inner layers may be structural layers with one or more protective layers containing the oxygen scavenging material positioned there between. In some embodiments, the outer and inner layers comprise and polyolefin or a polyester. In certain embodiments, a single layer design is preferred. Such a layer may have advantages in simplicity of manufacture and cost.

In this specification and in the claims that follow, reference will be made to a number of terms, which shall be defined to have the following meanings:

As used herein, the phrase "having the formula" or "having the structure" is not intended to be limiting and is used in the same way that the term "comprising" is commonly used. The term "independently selected from" is used herein to indicate that the recited elements, e.g., R groups or the like, can be identical or different.

As used herein, the terms "a", "an", "the" and the like refer to both the singular and plural unless the context clearly indicates otherwise. "A bottle", for example, refers to a single bottle or more than one bottle.

Also as used herein, the description of one or more method steps does not preclude the presence of additional method steps before or after the combined recited steps. Additional steps may also be intervening steps to those described. In addition, it is understood that the lettering of process steps or ingredients is a convenient means for identifying discrete activities or ingredients and the recited lettering can be arranged in any sequence.

Where a range of numbers is presented in the application, it is understood that the range includes all integers and fractions thereof between the stated range limits. A range of numbers expressly includes numbers less than the stated endpoints and those in-between the stated range. A range of from 1-3, for example, includes the integers one, two, and three as well as any fractions that reside between these integers.

As used herein, "master batch" refers to a mixture of base polymer, oxidizable organic component, and transition metal that will be diluted, typically with at least additional base polymer, prior to forming an article. As such, the concentrations of oxidizable organic component and transition metal are higher than in the formed article.

The following examples are included to demonstrate preferred embodiments of the invention regarding synthesis of the molecules and use of the molecules to scavenge oxygen as well products containing such scavengers. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Compositions detailed below were prepared, injection molded into multi-layer preforms, and stretch blow molded into 3-layer containers A/B/A, where the A layers are the structural PET layers and the B layer is the layer responsible for scavenging oxygen, although it also comprises PET, a structural polymer. Table 1 provides the details of the bottle compositions, which includes Comparative Examples 1 and 2.

Typically, the inventive compositions were used as the barrier layer in a 3-layer coinjection molded bottle preform. The 3-layer preforms were made by a sequential co-injection molding process consisting of 2 separate extruder feeds. In the PET feed extruder (extruder "A" heated to 260-270° C.), a neat PET resin (with no barrier additives), pre-dried to low moisture content <10 ppm, was used. In the barrier resin feed extruder (extruder "B" heated to 240-260° C.), PET resin pellets previously tumble blended with various levels of dibenzyladipamide (DBA) and cobalt neodecanoate powders added as as barrier additives, was fed into the extruder. The two melt feeds from the A & B extruders were sequentially coinjection molded, using a 2003 Battenfeld A800/200H/125HC co-injection molding machine into a single cavity 30 g 33 mm finish ketchup bottle preform to form a 3-layer preform with the middle layer of the barrier PET blend material comprising ca. 40% of the total preform weight. The cycle time for molding was about 30 sec.

In a $2^{nd}$ step, the above 3-layer preforms were reheat-stretch-blowmolded into 5-layer bottles. The bottles were typically stretch blown on a Sidel SBO-1 machine running at ca. 800 bottles per hour. In the process, the preforms were typically heated to a surface temperature of ca. 100° C. and then blown into a mold kept at about 12° C. with a blow pressure of about 33 bar. The 3-layer bottles so obtained were quite clear. These bottles were tested for oxygen scavenging performance using the Orbisphere test protocol as described in the next section.

TABLE 1

Oxygen Scavenging PET Compositions in 3-Layer Bottles, A/B/A

| Example No. | "A" Layer PET | "B" Layer |
| --- | --- | --- |
| 1 | PET-1 | PET-1 + 3% DBA + 0.1% CoNeo |
| 2 | PET-1 | PET-1 + 3.5% DBA + 0.1% CoNeo + 0.125% Red MB |
| 3 | PET-1 | PET-1 + 3% DBA + 0.1% CoNeo |
| 4 | PET-1 | PET-1 + 3.5% DBA + 0.1% CoNeo |
| 5 | PET-1 | PET-1 + 3.5% DBA + 0.1% CoNeo + 0.125% Red MB |
| 6 | PET-1 | PET-2 + 3% DBA + 0.1% CoNeo |
| 7 | PET-1 | PET-2 + 3.5% DBA + 0.1% CoNeo |
| 8 | PET-1 | PET-2 + 3.5% DBA + 0.1% CoNeo + 0.125% Red MB |
| Comparative Example 1 | PET-3 | PET-3 + 6% DBA + 0.25% CoNeo |
| Comparative Example 2 | PET-4 | PET-1 + 4% DBA + 0.1% CoNeo |

PET-1: DAK Laser + L44B (now redesignated as L40B) from DAK America, Inc., with a low phosphorous (V) level of about 10 ppm;
PET-2: DAK Laser + L44A (now redesignated as L40A), from DAK America, Inc., with a low phosphorous (V) level of about 10 ppm;
PET-3: Heatwave CF 746A, from Eastman Chemical Co., with a high phosphorous level of about 40 ppm;
PET-4: Parastar 9000, from Eastman Chemical Co., with a level of phosphorous (V) of >40 ppm;
DBA: N,N'-Dibenzyladipamide from Wilshire Technology Inc., Princeton, New Jersey;
CoNeo: cobalt neodecanoate (Shepherd Chemical Co.); and
Red MB: red colorant masterbatch from Colormatrix Inc.

Bottle Oxygen Scavenging Testing (Orbisphere Tests):

The bottles from Table 1 were tested for oxygen scavenging performance using standard orbisphere testing equipment (Orbisphere, Geneva, Switzerland). Typically each bottle is loaded on an orbisphere bench top filler and after an initial flushing with nitrogen, it is filled with deoxygenated water ($O_2$ content <100 ppb) and sealed with foil seal. After several bottles of each composition have been filled and sealed, they are stored under ambient conditions for a required shelf-life test period while the oxygen content or ingress in the bottles is monitored by periodically removing at least 3 bottles at a time to measure the oxygen content by using the orbisphere model 29972 sample device connected to Orbisphere model 3600 analyzer. For each measurement, the bottle seal is punctured and the liquid is forced out of the bottle with 20 psi nitrogen and through the orbisphere sensor analyzer. After 30-50% liquid has been removed the measurement is stable the reading of oxygen content is recorded. An average of 3 to 5 readings is taken for each of the periodic measurement.

Figure 1:
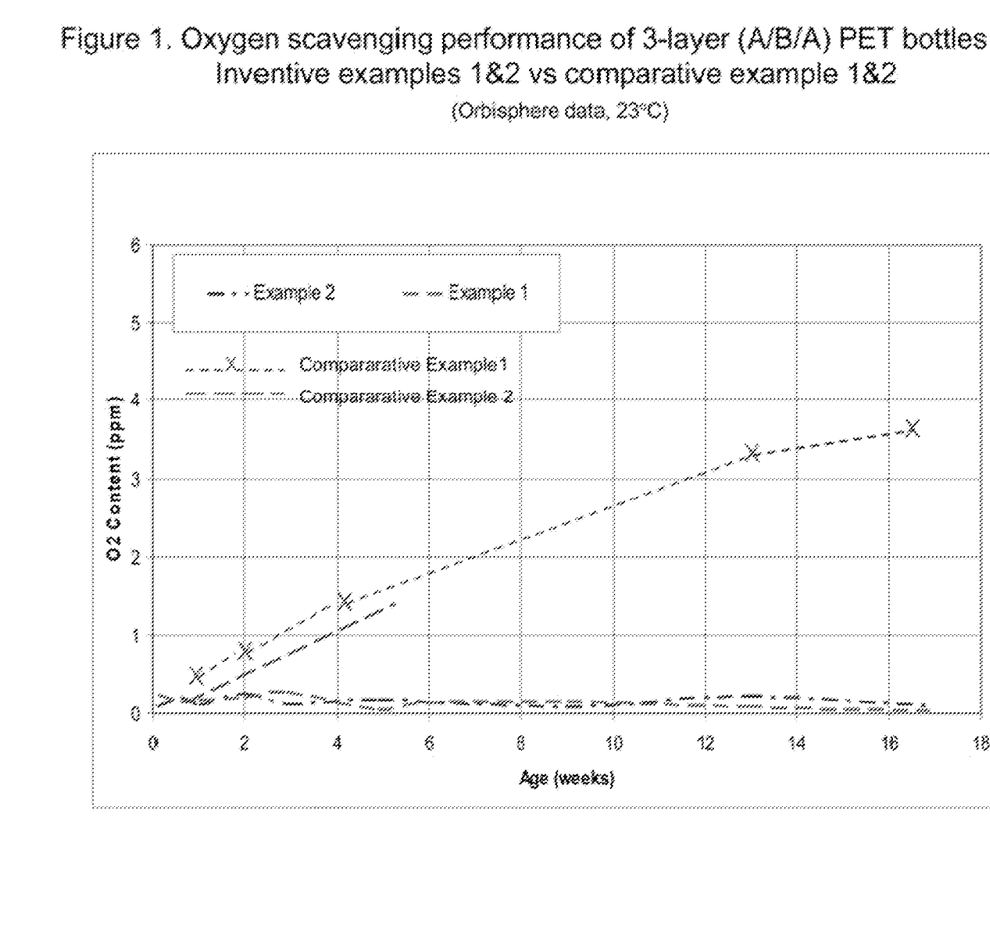
FIG. 1 is a graph showing oxygen scavenging performance of compositions according to the present invention.
Figure 2:
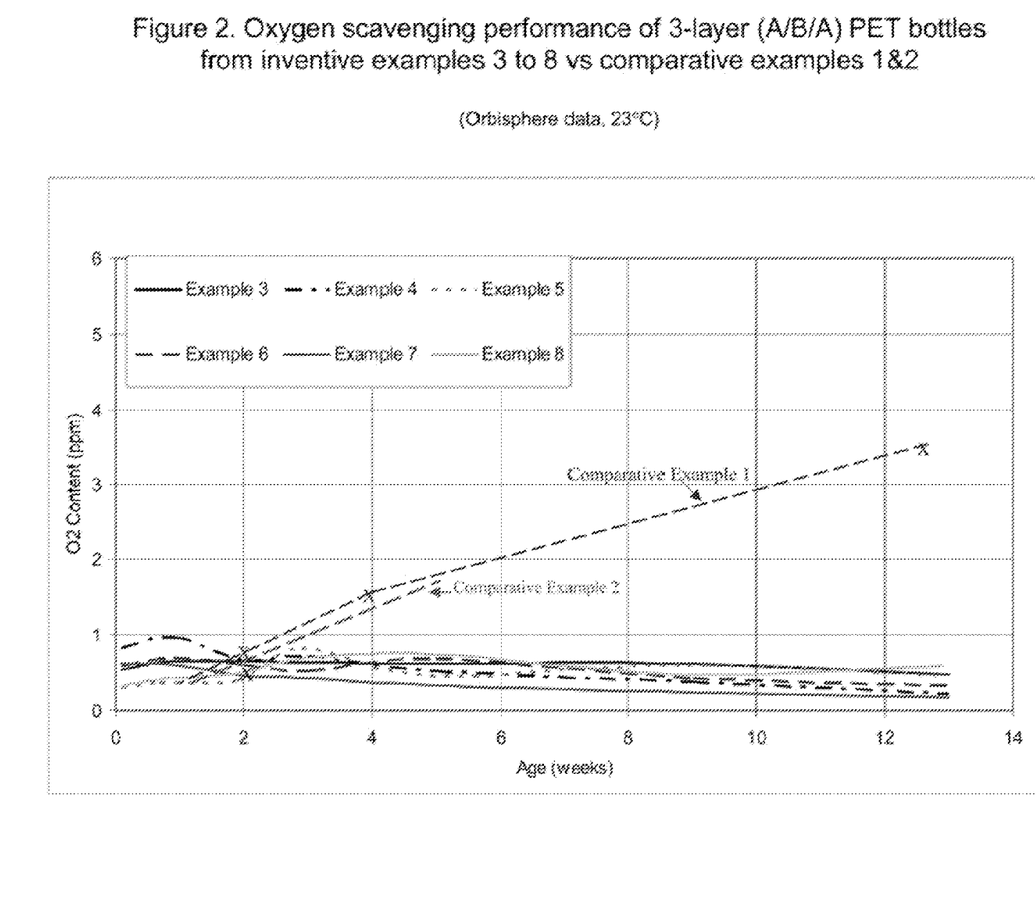
FIG. 2 is a graph showing oxygen scavenging performance of compositions according to the present invention.

The orbisphere data shown in FIGS. 1 and 2, clearly indicates that oxygen scavenging occurs initially—without any aging—for the bottles that include DBA, cobalt neodecanoate, and low phosphohorous PET according to the present invention. In contrast, the Comparative Examples, which employ PET compositions comprising 40 ppm or higher of phosphorous, exhibit an increase in oxygen content over at least three months because such compositions have not yet begun to scavenge oxygen.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

The invention claimed is:

1. A composition comprising:
   a) polyethylene terephthalate;
   b) a non-polymeric oxidizable organic compound present in an amount of about 1 to about 3 weight percent based upon the weight of the composition, where said non-polymeric oxidizable organic compound is dibenzyl adipamide; and
   c) cobalt, said cobalt being present in the composition in an amount of from about 10 to about 400 ppm, wherein the polyethylene terephthalate comprises less than 40 ppm of total phosphorous.

2. The composition of claim 1 wherein the concentration of transition metal is 30 to 150 ppm.

3. The composition of claim 1 wherein the polyethylene terephthalate comprises less than 30 ppm of total phosphorous.

4. The composition of claim 3 wherein the polyethylene terephthalate comprises less than 20 ppm of total phosphorous.

5. The composition of claim 4 wherein the polyethylene terephthalate comprises less than 10 ppm of total phosphorous.

6. The composition of claim 5 wherein the polyethylene terephthalate is substantially free of phosphorous.

7. A multilayer container wall comprising at least one layer, comprising a composition, said composition comprising:
   a) polyethylene terephthalate;
   b) a non-polymeric oxidizable organic compound present in an amount of about 1 to about 3 weight percent based upon the weight of the composition, where said non-polymeric oxidizable organic compound is dibenzyl adipamide; and
   c) cobalt, said cobalt being present in the composition in an amount of from about 10 to about 400 ppm, wherein the polyethylene terephthalate comprises less than 40 ppm of total phosphorous.

8. The wall of claim 7 wherein the concentration of transition metal is 30 to 150 ppm.

9. The wall of claim 7 wherein the polyethylene terephthalate comprises less than 30 ppm of total phosphorous.

10. The wall of claim 9 wherein the polyethylene terephthalate comprises less than 20 ppm of total phosphorous.

11. The wall of claim 10 wherein the polyethylene terephthalate comprises less than 10 ppm of total phosphorous.

12. The wall of claim 11 wherein the polyethylene terephthalate is substantially substantially free of phosphorous.

* * * * *